Aug. 11, 1953 D. A. H. OLSON 2,648,594
MANUFACTURE OF AMMONIUM SULFATE FROM REFINERY WASTES
Filed May 10, 1951
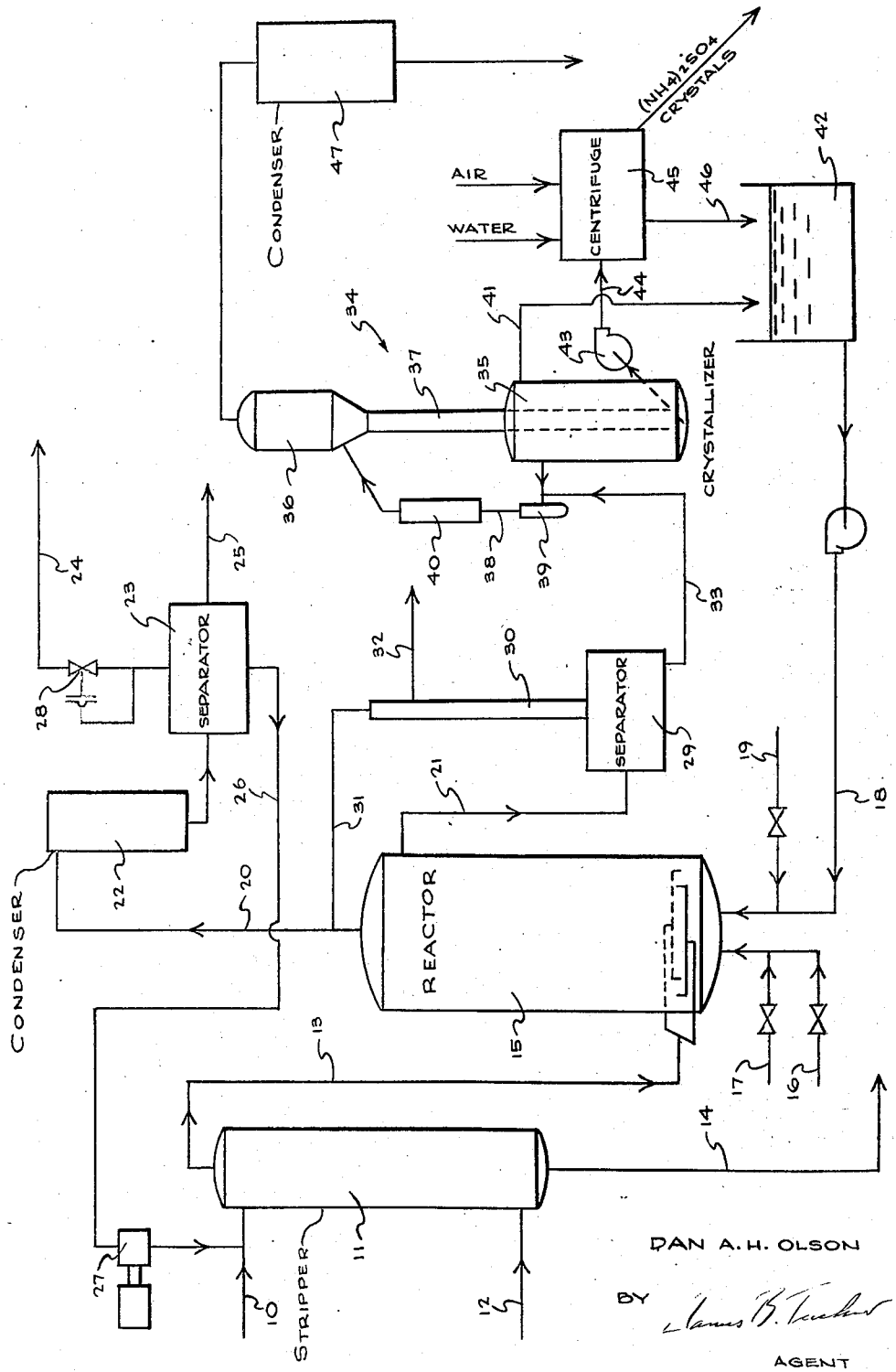
DAN A. H. OLSON
BY
AGENT Patented Aug. 11, 1953

2,648,594

UNITED STATES PATENT OFFICE 2,648,594

MANUFACTURE OF AMMONIUM SULFATE FROM REFINERY WASTES

Dan A. H. Olson, Huntington Park, Calif., assignor to Socony-Vacuum Oil Company, Incorporated, New York, N. Y., a corporation of New York Application May 10, 1951, Serial No. 225,507

11 Claims. (Cl. 23—119)

This invention relates to the manufacture of ammonium sulfate from the ammonia produced in the cracking of nitrogen-bearing petroleum fractions and from the sludge obtained in the treatment of petroleum distillates with sulfuric acid.

Ammonium sulfate has previously been made from acid sludge by the reaction of ammonia or a strong ammonia solution with the sludge or with an aqueous acid solution obtained by hydrolysis of the sludge. In these processes removal of nitrogen bases and other contaminants has been a serious problem; even though elaborate oil-separation systems have been employed, the ammonium-sulfate crystals eventually produced have been colored, malodorous, and not free of a tendency to become caked in storage.

The materials withdrawn from catalytic cracking units include considerable quantities of water which, after condensation, is separated from the hydrocarbons and withdrawn. In the case of a refinery employing nitrogen-rich crude oil, such as California petroleum, this water contains ammonia in solution, principally as the hydrosulfide, sulfide, and carbonates of ammonium. To a lesser extent, similar waste water is obtained from the products of thermal cracking units and from other sources in a refinery. Heretofore, utilization or even disposal of this waste water has been a difficult problem.

In the present process, the waste water is stripped with steam to yield a vaporous effluent consisting of steam with 2% to 3% ammonia, a similar proportion of hydrogen sulfide, and a smaller proportion of carbon dioxide. The fouled steam is introduced to a reaction vessel with acid sludge, added oil of low volatility, and a recycled solution of ammonium sulfate. In the reaction vessel, the steam (aided by heat from the exothermic reaction) again acts as a stripping medium, removing the more volatile components and decomposition products of the acid sludge. A suspension of less volatile oil in a strong aqueous solution of ammonium sulfate is withdrawn from the reactor. This suspension separates easily and cleanly under the mildly acid conditions hereinafter specified, and after separation the oil-free solution of ammonium sulfate is passed to crystallizing equipment wherein water is evaporated by means of the heat carried from the reactor.

This process avoids concentration of ammonia beyond the 2%–3% level feasible by steam stripping, it avoids preliminary hydrolysis of acid sludge, it simplifies separation of sludge oil from the aqueous solution, and it yields a crystalline ammonium sulfate which is colorless, odorless, and free-flowing.

The drawing is a flow diagram illustrating the process.

Referring to the drawing, the material introduced by line 10 is the waste water drawn from various sources in a refinery, carrying in solution ammonia, hydrogen sulfide, carbon dioxide, and minor amounts of other impurities. In stripping column 11 this water is brought into contact with steam introduced by line 12 and withdrawn by line 13. The stripped waste water withdrawn by line 14, which is virtually freed of its impurities, may be discharged to a sewer or utilized.

The fouled steam in line 13, carrying $NH_3$, $H_2S$, and $CO_2$, is introduced to the lower portion of reaction vessel 15, preferably at a plurality of points distributed about the circumference of the vessel. Acid sludge from line 16, mingled with oil from line 17, is introduced to the bottom of the reactor. Recycled ammonium-sulfate solution from line 18, together with a small amount of water from line 19, is also introduced to the bottom of the reactor.

The acid sludge in line 16 is the waste product obtained in the treatment of various petroleum fractions with sulfuric acid. This sludge is an extremely complex material, containing (among other components) sulfonic acids, sulfuric esters, sulfates of nitrogen bases, water, free sulfuric acid, and entrained oil. The available sulfuric-acid content of the sludge is ordinarily between 30% and 50%. The sludge is augmented by from 5% to 100% (preferably at least 20%) by volume of oil from line 17. This oil should be substantially nonvolatile under the conditions existing in the reactor, and it is preferably an aromatic fraction, such as the cycle stock from a catalytic cracking unit.

The fluids within the reactor are kept in a state of vigorous agitation by the introduced steam, thus insuring effective contact among the oil, gas, and aqueous phases.

The ammonia introduced with the steam reacts with the free sulfuric acid and the sulfates of nitrogen bases, and to some extent with other compounds of sulfuric acid, to produce ammonium sulfate. The reaction is strongly exothermic and ordinarily supplies all the heat required for the eventual evaporation of water and crystallization of the product.

The hydrogen sulfide and carbon dioxide pass through the reactor unchanged and are withdrawn by overhead vapor line 20, together with enough steam to maintain the ammonium-sulfate concentration of the aqueous phase of the liquid effluent (withdrawn by line 21) at at least 35% by weight and preferably at 45% to 50%, or just less than saturation at the existing temperature. In preferred forms of the process, the amount of steam withdrawn is approximately equal to the amount of steam introduced; so the steam also may be regarded as passing through the reactor unchanged.

It is not to be understood that the concentration of the liquid effluent should be controlled by variation in the quantity of steam withdrawn. It is preferable to maintain a constant pressure in the reactor. This pressure is chosen with a view to the general level of ammonium-sulfate concentration which is preferred, but actual control of the concentration is effected by variation of the small amount of make-up water added by line 19 or, if necessary, by applying supplementary heat to the system in a manner which will be described.

In addition to the steam, hydrogen sulfide, and carbon dioxide, line 20 withdraws the volatile products of the sludge decomposition, which may amount to half of the oily materials yielded by the process. This fact contributes greatly to the success of the process, since the volatile oil includes those substances (such as the lower, more active nitrogen bases) which have been the most harmful in previous processes for manufacture of ammonium sulfate from acid sludge. The immediate removal of these substances at the time of the reaction is simple and unexpectedly effective, whereas their removal at a later stage of the process could be achieved only with difficulty. If substantially complete removal of these substances from the ammonium-sulfate solution is not achieved, the crystals produced are malodorous and otherwise of poor quality.

Also, the withdrawn vapors include such sulfur dioxide as may be derived from the acid sludge.

The less volatile oils from the acid sludge, assisted by the oil added from line 17, form a liquid oil phase which is capable of separating readily and cleanly from the aqueous solution, provided that alkaline conditions are avoided. Consequently, the harmful by-products of the reaction are removed from the aqueous solution either by ebullition or by solution in the oil phase. Similar purification of the ammonium-sulfate solution, which is essential to the recovery of a good quality crystalline product, has been achieved in the past only by elaborate combinations of stripping, filtration, extraction, etc.

The flow of acid sludge to the reactor is controlled to maintain the acidity of the contents of the reactor (as measured in the aqueous phase of the liquid effluent) between the limits 0.05% and 1.5% free sulfuric acid by weight, preferably between the limits 0.1% and 0.5%.

The vapors in line 20 are conveyed to condenser 22 and separator 23. From the latter, gas is withdrawn by line 24, oil by line 25, and water by line 26. The gas consists mainly of hydrogen sulfide with smaller amounts of water vapor, carbon dioxide, and sulfur dioxide; this material may be combined with other supplies of hydrogen sulfide for manufacture into sulfur and sulfuric acid. The water, which is somewhat contaminated with acidic gases and nitrogen bases, is returned to stripper 11 by pump 27. The oil, which may be utilized in various ways, is conducted to storage.

Line 24 is provided with back-pressure regular 28 which, together with the valves of the conventional interface controllers in separator 23, maintains constant pressure in line 20 and in reactor 15.

The above-mentioned solution of ammonium sulfate bearing in suspension oil of low volatility overflows from the liquid surface within reactor 15 and is conveyed to separator 29 by line 21. This separator includes standpipe 30, the upper end of which communicates with vapor line 20 by means of line 31, to maintain equalized pressure in the reactor and in the separator. Separated oil is withdrawn by line 32 and conducted to storage, while separated ammonium-sulfate solution is taken by line 33 and conveyed to the crystallizing equipment generally indicated at 34.

The crystallizer, which is of known design, includes crystal suspension basket 35, vaporizing chamber 36 communicating with the bottom of the basket by barometric leg 37, and circulating pipe 38, which is provided with pump 39 and heater 40. Since the heat from reactor 15 normally supplies all the heat needed to operate the crystallizer, heater 40 is ordinarily used only to facilitate starting the process; however, the heater also serves as a stand-by to provide supplementary heat in the event that it is needed.

The ammonium-sulfate solution from separator 29 is conveyed to the intake of pump 39, where it is mixed with some of the cooler, saturated solution from basket 35, and the combined stream is pumped into vaporizer 36 where water vapor is flashed off by reduction of pressure to a subatmospheric level. The supersaturated solution of ammonium sulfate which is produced by this evaporation flows down through barometric leg 37 to the bottom of basket 35, wherein crystal growth occurs. The larger crystals settle to the bottom of the basket, while smaller ones remain suspended by the upward flow of liquid in the basket.

In addition to the solution taken from the basket by pump 39, a recycle stream is withdrawn from the upper portion of the basket by overflow and is conveyed by line 41 to mother-liquor tank 42.

A slurry of fully grown ammonium-sulfate crystals is withdrawn from the bottom of basket 35 by pump 43 and conveyed by line 44 to centrifuge 45. In the centrifuge, which is also of known design, the excess solution is whirled off, the crystals are washed with a small volume of water or ammonia solution, and the crystals are finally dried by a stream of warm air and discharged. The liquid from the centrifuge is conveyed to tank 42 by line 46.

The low pressure in vaporizing chamber 36 is maintained by condenser 47, which withdraws and liquefies water vapor from the top of the vaporizer.

A stream of ammonium-sulfate solution is pumped from tank 42 into line 18 and returned to reactor 15. The primary function of this recycle is to provide a medium for transmitting heat from the reactor to the crystallizer. If the comparatively small volume of freshly created ammonium-sulfate solution were relied upon for carrying the heat, it would be necessary to operate the reactor at excessively high temperature and pressure, but if the aqueous effluent from the reactor is augmented by the recycle, only moderate temperature and pressure are required. Also, the recycle serves to stabilize ammonium sulfate concentration, acidity, and other conditions in the reactor.

The reactor is operated at the boiling point of the strong ammonium-sulfate solution existing therein at the chosen pressure, which should be somewhat greater than atmospheric. Since the aqueous solution must be at least 35% ammonium sulfate, and since it is scarcely feasible to operate the reactor at less than atmospheric pressure, the minimum reaction temperature is 217° F. With the somewhat higher concentration and pressure ordinarily preferred, the reaction temperature is 240° F. or more. The exothermic reaction between ammonia and the acid sludge supplies all the heat necessary to raise the sludge, oil, recycled liquor, and make-up water from lines 16 to 19 inclusive to that temperature. Of these materials, the sludge, oil, and make-up water ordinarily have initial temperatures at about the atmospheric level, while the recycle stream may be at about 150° F. The steam in line 13 is at a temperature somewhat higher than that of the reactor; however, little or none of this steam is condensed, and the heat available from its temperature drop is at least balanced by the heat required to vaporize the volatile oils from the sludge.

The heat of reaction is, in fact, a little more than sufficient to effect the necessary evaporation of water and crystallization of ammonium sulfate in the crystallizer and to make up for customary heat losses. It is for this reason that additional water to be evaporated is supplied from line 19. Other methods of removing excess heat are feasible, but do not provide such convenient and accurate control of the heat balance and the ammonium sulfate concentration.

If the requirements for heat energy were the only consideration, it would not matter how the total withdrawal of water vapor is proportioned between the overhead from reactor 15 and the overhead from vaporizer 36. However, in order to obtain the best purification of the ammonium-sulfate solution, it is necessary that the stripping effect in the reactor be at a maximum and that the concentration of ammonium sulfate in the reactor and in separator 29 be as great as possible without danger of premature crystallization of ammonium sulfate. For both reasons, it is preferable that the withdrawal of steam from the reactor be at the highest rate which can be employed without approaching too closely to a saturated solution of ammonium sulfate in the reactor and without requiring the addition of more water from line 19 than can be evaporated by the available excess heat. Concentrations down to about 35% by weight ammonium sulfate in the aqueous phase of the reactor effluent can be employed successfully, but below that level the retention of malodorous substances in the aqueous solution increases sharply, with the result that the crystalline product is objectionable.

In a specific example of the process, reactor 15 is a closed, stainless steel vessel of 275 barrels' capacity and containing a liquid body 16 feet in depth. The crystallizer and centrifuge are of known design, and the condensers, separators, valves, pumps, etc. are standard equipment, well known in petroleum refineries and elsewhere.

With the plant running at capacity, line 13 carries about 11,000 pounds per hour of fouled steam containing 2.6% ammonia, at a temperature of 256° F. and pressure of 20 pounds per square inch gauge. The flow of acid sludge in line 16 is controlled to maintain the free acid content of the aqueous solution withdrawn from the reactor within the limits 0.1% to 0.5% by weight, which results in the consumption of a little over 2000 pounds per hour of sludge of 41% sulfuric-acid content and 14% water content. Line 17 adds 25% by volume, with respect to the sludge, of cycle stock from a catalytic cracker, which is a highly aromatic fraction having an initial boiling point of 420° F.

Line 18 carries about 9160 pounds per hour of recycled 47.5% ammonium-sulfate solution at a temperature of 150° F. The quantity of water added by line 19, which is varied to maintain the concentration of the aqueous ammonium-sulfate solution withdrawn from the reactor at close to 50% by weight, runs about 330 pounds per hour.

Back-pressure controller 28 is set at 5 pounds per square inch gauge, which, because of pressure drop in the intervening equipment, results in a pressure of 7 pounds per square inch gauge and a temperature of 243° F. in the top of reactor 15.

With the exceptions of the withdrawal of the recycle stream by line 41 and the usual non-use of heater 40, the crystallizer and the centrifuge are operated entirely in the conventional manner. The pressure in vaporizer 36 is maintained at about 2.9 pounds per square inch absolute.

The product of the above-described plant, which amounts to about 13.4 tons per day of ammonium sulfate at full capacity, has been found to consist of colorless, odorless, free-flowing crystals having average nitrogen content of 20.91%, moisture content of .033%, and free sulfuric acid content of .018%.

I claim as my invention:

1. A method of manufacturing ammonium sulfate which includes: continuously introducing to a reaction zone ammonia, steam, and a material containing sulfuric acid, oil, and oil-soluble contaminants; withdrawing from said reaction zone a suspension of aqueous ammonium-sulfate solution and liquid oil, said liquid oil including the less volatile portion of said contaminants; withdrawing from said reaction zone steam with vapors of volatile contaminants, said withdrawal of steam being sufficient in amount to yield concentration of at least 35% ammonium sulfate by weight in said withdrawn aqueous solution; maintaining sufficient liquid water in said reaction zone to prevent crystallization of ammonium sulfate therein; and separating said withdrawn aqueous solution from said liquid oil.

2. A method as defined in claim 1, including the introduction to said reaction zone of an oil substantially nonvolatile at the temperature and pressure of said reaction zone.

3. A method as defined in claim 1, in which said withdrawal of steam is controlled by maintenance of constant pressure in said reaction zone and in which minor variations of ammonium-sulfate concentration of said withdrawn aqueous solution are controlled by introduction of a variable quantity of water to said reaction zone.

4. A method as defined in claim 1, in which said separated ammonium-sulfate solution is partially evaporated to effect crystallization of ammonium sulfate, and in which at least a portion of the ammonium-sulfate solution remaining from said evaporation and crystallization is recycled to said reaction zone.

5. A method of manufacturing ammonium sulfate which includes: continuously introducing to a reaction zone fouled steam including ammonia, and oil-bearing acid sludge derived from the treatment of petroleum fractions with sulfuric acid; withdrawing from said reaction zone a suspension of aqueous ammonium-sulfate solution and liquid oil; withdrawing from said reaction zone steam with contaminants including volatile components and decomposition products of said acid sludge, said withdrawal of steam being sufficient in amount to yield concentration of at least 35% ammonium sulfate by weight in said withdrawn aqueous solution; maintaining sufficient liquid water in said reaction zone to prevent crystallization of ammonium sulfate therein; and separating said aqueous solution from said liquid oil.

6. A method as defined in claim 5, including the introduction to said reaction zone of an oil substantially nonvolatile at the temperature and pressure of said reaction zone.

7. A method as defined in claim 5, in which said withdrawal of steam is controlled by maintenance of constant pressure in said reaction zone and in which minor variations of ammonium-sulfate concentration of said withdrawn aqueous solution are controlled by introduction of a variable quantity of water to said reaction zone.

8. A method as defined in claim 5, in which said separated ammonium-sulfate solution is partially evaporated to effect crystallization of ammonium sulfate, and in which at least a portion of the ammonium-sulfate solution remaining from said evaporation and crystallization is recycled to said reaction zone.

9. A method as defined in claim 5, in which the proportion of said acid sludge with respect to said ammonia is controlled to maintain the free sulfuric-acid content of said withdrawn aqueous solution within the limits 0.05% and 1.5% by weight.

10. A method of manufacturing ammonium sulfate which includes: continuously introducing to a stripping zone steam and petroleum-refinery waste water containing ammonia; withdrawing from said stripping zone steam fouled with gaseous substances including ammonia; introducing to a reaction zone said fouled steam and oil-bearing acid sludge derived from the treatment of petroleum fractions with sulfuric acid; withdrawing from said reaction zone a suspension of aqueous ammonium-sulfate solution and liquid oil; withdrawing from said reaction zone steam with contaminants including volatile components and decomposition products of said acid sludge, said withdrawal of steam being sufficient in amount to yield concentration of at least 35% ammonium sulfate by weight in said withdrawn aqueous solution; maintaining sufficient liquid water in said reaction zone to prevent crystallization of ammonium sulfate therein; and separating said aqueous solution from said liquid oil.

11. A method of manufacturing ammonium sulfate which includes: continuously introducing to a reaction zone ammonia, steam, an oil substantially nonvolatile at the temperature and pressure of said reaction zone, and a material containing sulfuric acid and oil-soluble contaminants; withdrawing from said reaction zone a suspension of aqueous ammonium-sulfate solution and liquid oil, said liquid oil including the less volatile portion of said contaminants; withdrawing from said reaction zone steam with vapors of volatile contaminants, said withdrawal of steam being sufficient in amount to yield concentration of at least 35% ammonium sulfate by weight in said withdrawn aqueous solution; maintaining sufficient liquid water in said reaction zone to prevent crystallization of ammonium sulfate therein; and separating said withdrawn aqueous solution from said liquid oil.

DAN A. H. OLSON.

References Cited in the file of this patent

UNITED STATES PATENTS

| Number | Name | Date |
| --- | --- | --- |
| 1,932,674 | Pyzel | Oct. 31, 1933 |
| 1,988,701 | Pyzel | Jan. 22, 1935 |
| 2,025,401 | Rutherford | Dec. 24, 1935 |
| 2,026,250 | Pyzel | Dec. 31, 1935 |
| 2,331,235 | Ruys et al. | Oct. 5, 1943 |